(12) United States Patent
Headworth

(10) Patent No.: US 7,798,232 B2
(45) Date of Patent: Sep. 21, 2010

(54) CONNECTING COMPLIANT TUBULAR MEMBERS AT SUBSEA LOCATIONS

(75) Inventor: Colin Headworth, Aberdeen (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 12/020,215

(22) Filed: Jan. 25, 2008

(65) Prior Publication Data

US 2009/0191001 A1    Jul. 30, 2009

(51) Int. Cl.
     *E21B 23/00* (2006.01)
(52) U.S. Cl. .................. 166/352; 166/338; 166/339; 166/341; 166/343; 166/344; 166/355; 405/224.2; 405/224.3
(58) Field of Classification Search .......... 166/352, 166/338, 339, 341–346, 354; 405/224.2–224.4, 405/183.5
See application file for complete search history.

(56) References Cited

U.S. PATENT DOCUMENTS

| | | | |
|---|---|---|---|
| 3,265,130 A | | 8/1966 | Watkins |
| 4,386,659 A | * | 6/1983 | Shotbolt ................. 166/342 |
| 4,570,716 A | * | 2/1986 | Genini et al. ............ 166/346 |
| 4,588,326 A | | 5/1986 | Langner |
| 4,730,677 A | * | 3/1988 | Pearce et al. ............ 166/345 |
| 5,117,914 A | * | 6/1992 | Blandford ............... 166/344 |
| 5,433,273 A | * | 7/1995 | Blandford ............... 166/344 |
| 5,749,676 A | * | 5/1998 | Head ...................... 405/171 |
| 5,778,981 A | * | 7/1998 | Head ...................... 166/345 |
| 5,944,448 A | * | 8/1999 | Williams ................ 405/169 |
| 6,161,619 A | * | 12/2000 | Head ...................... 166/355 |
| 6,276,456 B1 | * | 8/2001 | Head ...................... 166/359 |
| 6,386,290 B1 | * | 5/2002 | Headworth .............. 166/346 |
| 6,691,775 B2 | * | 2/2004 | Headworth .............. 166/77.2 |
| 6,745,840 B2 | * | 6/2004 | Headworth .............. 166/346 |
| 6,834,724 B2 | * | 12/2004 | Headworth .............. 166/384 |
| 7,044,228 B2 | * | 5/2006 | Langford et al. ........ 166/350 |
| 7,264,057 B2 | * | 9/2007 | Rytlewski et al. ....... 166/338 |
| 7,416,025 B2 | * | 8/2008 | Bhat et al. .............. 166/355 |
| 2002/0134552 A1 | * | 9/2002 | Moss ..................... 166/339 |
| 2004/0226722 A1 | * | 11/2004 | Colyer et al. ........... 166/345 |
| 2008/0185152 A1 | * | 8/2008 | Sbordone et al. ........ 166/341 |
| 2008/0185153 A1 | * | 8/2008 | Smedstad et al. ....... 166/345 |

* cited by examiner

*Primary Examiner*—Thomas A Beach
*Assistant Examiner*—Matthew R Buck
(74) *Attorney, Agent, or Firm*—Myron K. Stout

(57) ABSTRACT

A technique facilitates formation of connections between compliant tubular members and subsea facilities. A compliant tubular member is deployed to a subsea location in a manner that arranges the compliant tubular member in a curvilinear shape. The distal end of the compliant tubular member is drawn down into proximity with the subsea facility and then moved horizontally into alignment with the subsea facility. Subsequently, the distal end is lowered into engagement with the subsea facility without being detrimentally affected by motion of an upper end of the compliant tubular member.

23 Claims, 14 Drawing Sheets

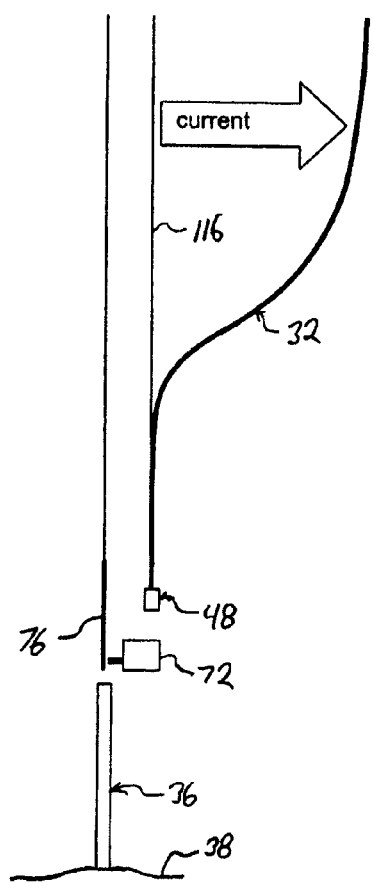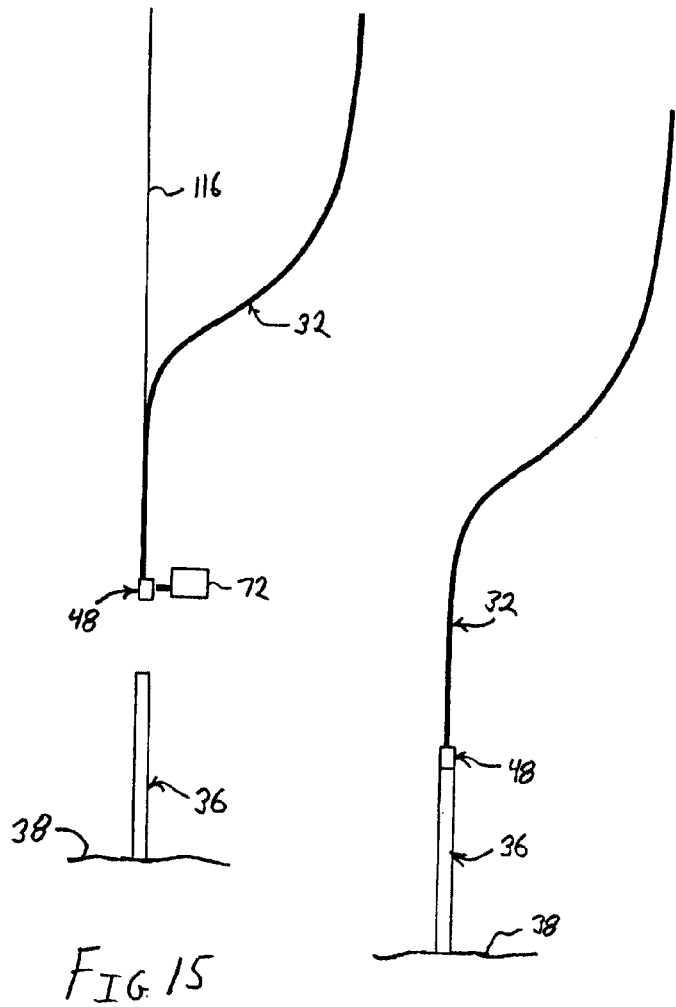
FIG. 14
FIG. 15
FIG. 16

CONNECTING COMPLIANT TUBULAR MEMBERS AT SUBSEA LOCATIONS

BACKGROUND

The production and transfer of fluids from subsea facilities relies on surface vessels or structures, subsea flow lines and other equipment. In some applications, a compliant tubular member is deployed between a surface vessel and a subsea facility. When the compliant tubular member is deployed, it is subjected to controlled movements from the deployment system, used to raise and lower the compliant tubular member, and to uncontrolled movements induced by motion of the surface vessel on the sea. The uncontrolled movements can create difficulties in placing the distal end of the compliant tubular member in proximity to the subsea facility when attempting to connect the compliant tubular member to the subsea facility.

Compliant tubular members are generally hollow tubes having ends that can be repeatedly moved relative to each other by bending, for example, without compromising the integrity of the tubular member. Depending on the location of the subsea facility, compliant tubular members can vary substantially in length. In most applications, the compliant tubular members are more than 30 meters in length and can be as much as 3000 or more meters in length. A compliant tubular member can be used as a conduit for deploying a conveyance member, e.g. coiled tubing, rod, solid wire, braided wire, wireline, slickline or other conveyances, into a subsea facility. Depending on the intended operation in the subsea facility, the conveyance member may require attachment of a tool string to its distal end. However, many types of tool strings cannot be passed through the compliant tubular member due to the size or rigidity of the tool string.

SUMMARY

In general, the present invention provides a technique for connecting a compliant tubular member at a subsea location and/or for connecting a tool string to an inserted conveyance member. One end of the compliant tubular member is deployed to a subsea location in a manner that arranges the compliant tubular member in a curvilinear shape. A buoyant force, created by the compliant tubular member itself or by one or more attached buoyancy modules, is used, together with downward forces, to maintain a lower section of the compliant tubular member in a generally vertical orientation and to significantly reduce uncontrolled movements of the lower section. The distal end is then moved horizontally into alignment with a subsea facility and subsequently moved vertically downwards into engagement with the subsea facility. In one embodiment, a conveyance member is run down through the compliant tubular member and into engagement with the subsea facility. Once engaged with the subsea facility, a reduction in deployed length of the conveyance member moves and guides the distal end of the compliant tubular member into engagement with the subsea facility. In many applications, the conveyance member is connected to a tool string after it has passed through the compliant tubular member which greatly simplifies the operation and provides more deployment options.

BRIEF DESCRIPTION OF THE DRAWINGS

Certain embodiments of the invention will hereafter be described with reference to the accompanying drawings, wherein like reference numerals denote like elements, and:

FIG. 14 is a schematic front elevation view of an alternate embodiment for disengaging and engaging the compliant tubular member with a subsea facility, according to an alternate embodiment of the present invention;

FIG. 15 is a schematic front elevation view similar to that of FIG. 14 but with the compliant tubular member positioned at a subsequent stage, according to an alternate embodiment of the present invention; and FIG. 16 is a schematic front elevation view similar to that of FIG. 15 but with the compliant tubular member positioned at a subsequent stage, according to an alternate embodiment of the present invention.

DETAILED DESCRIPTION

Figure 1:
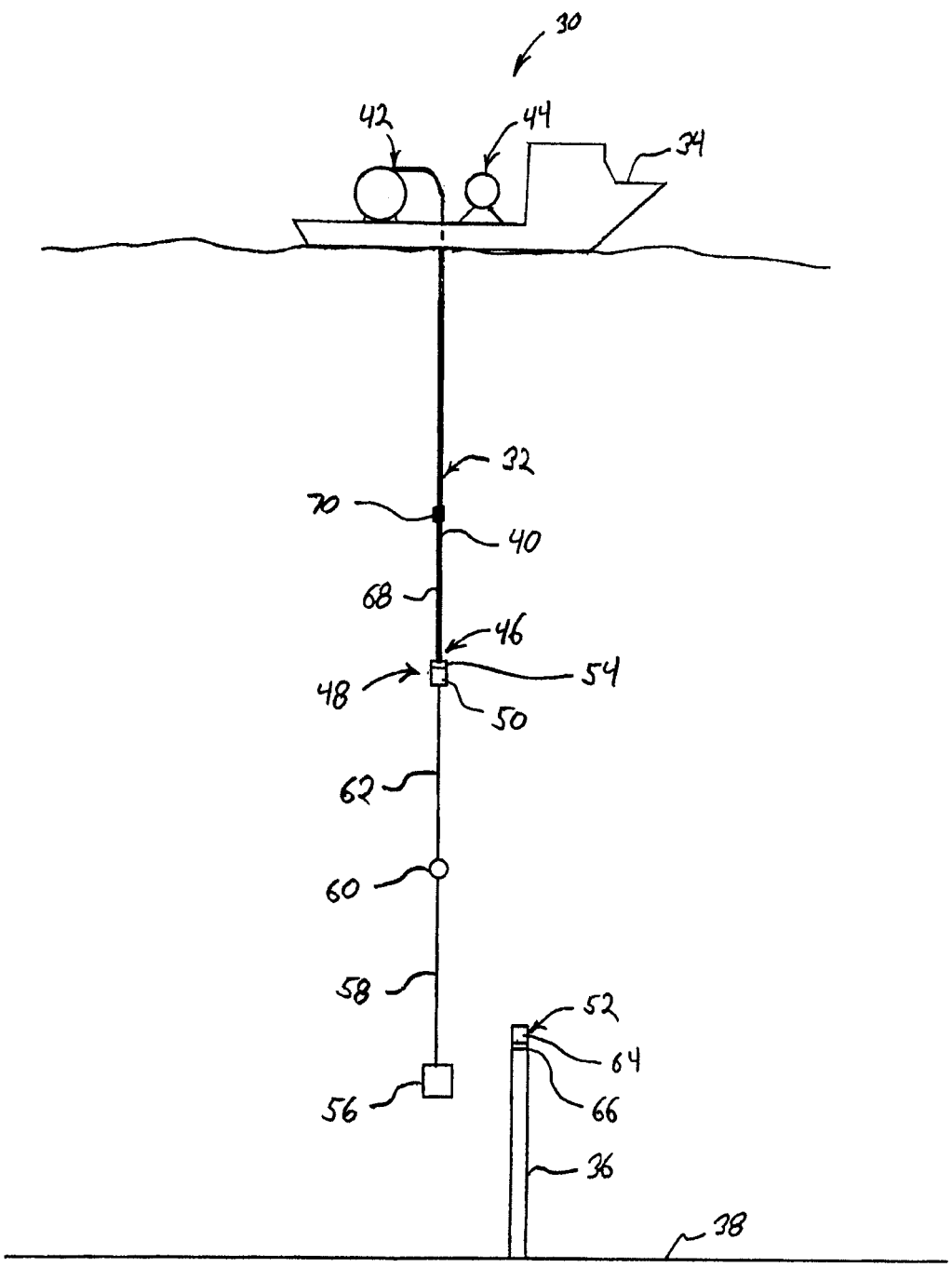
FIG. 1 is a schematic front elevation view of a compliant tubular member being deployed from a surface vessel to a subsea facility, according to an embodiment of the present invention.

In the following description, numerous details are set forth to provide an understanding of the present invention. However, it will be understood by those of ordinary skill in the art that the present invention may be practiced without these details and that numerous variations or modifications from the described embodiments may be possible.

The present invention generally relates to a technique for connecting a compliant tubular member with a subsea facility. The technique enables uncontrolled movements occurring at a surface location to be effectively attenuated at the lower or distal end of the compliant tubular member. The ability to attenuate movement of the distal end and to facilitate subsea connections enables a variety of intervention operations on or in a subsea facility in otherwise problematic seas. One benefit is extension of the weather window during which many types of intervention operations can be conducted.

The compliant tubular members can have a variety of sizes and lengths. By way of example, compliant tubular members can be deployed between surface vessels and subsea facilities that are 30 to 3000 or more meters apart. The compliant tubular member also can have a variety of diameters depending on the environment and desired subsea operations. For example, the diameter of the compliant tubular member can range from 1 centimeter to 50 centimeters or more, although many operations can be conducted with compliant tubular members ranging from 4 centimeters to 15 centimeters in diameter. Additionally, the compliant tubular member can be constructed from a variety of materials and with a variety of structures. The compliant members can comprise layered walls, composite walls, spiral wound walls, bonded walls, non-bonded walls, homogeneous walls, non-homogeneous walls, and other suitable wall formations. Additionally, compliant members can be formed from metal materials, rubber materials, plastic materials, fiberglass/epoxy materials, carbon fiber/epoxy materials, composite materials and other suitable materials. The compliant tubular member also can be continuous from end to end or formed from a plurality of joined sections, each of which may be formed as a different construction or from a different material.

In many applications, the compliant tubular member comprises a spoolable compliant guide that can be used as a conduit for running a conveyance member, such as coiled tubing, in a subsea facility. As described in greater detail below, the present technique facilitates connection of a compliant tubular member, e.g. spoolable compliant guide, with a subsea facility, such as a subsea wellhead, a subsea tree, a subsea lubricator, or other subsea facility. The technique also facilitates both the conveyance of coiled tubing into and out of the subsea facility and deployment or changing of tool strings that are selectively connected to the distal end of the coiled tubing.

The compliant tubular member and coiled tubing work string can be stored on separate reels which enables the use of readily available coiled tubing reels already integrated into complete coiled tubing operational systems having a separate control for the coiled tubing reel. The coiled tubing work string need not be inserted into the compliant tubular member before the compliant tubular member is run. Thus, the compliant tubular member and coiled tubing work string can be run and retrieved separately at different times to enable simpler and more convenient operations. Furthermore, if a spoolable compliant guide is used, the guide does not need to be reeled back onto the reel and then rerun with each change of coiled tubing tool string. This conserves time and can significantly reduce fatigue damage to the spoolable compliant guide. Component parts of the compliant tubular member can be lifted back to the surface vessel for maintenance or redressing while the remaining portion of the compliant tubular member remains deployed to a subsea location in a temporary "parked" position. The technique described herein also reduces the risk of damage due to impact between the compliant tubular member and the subsea facility.

Figure 5:
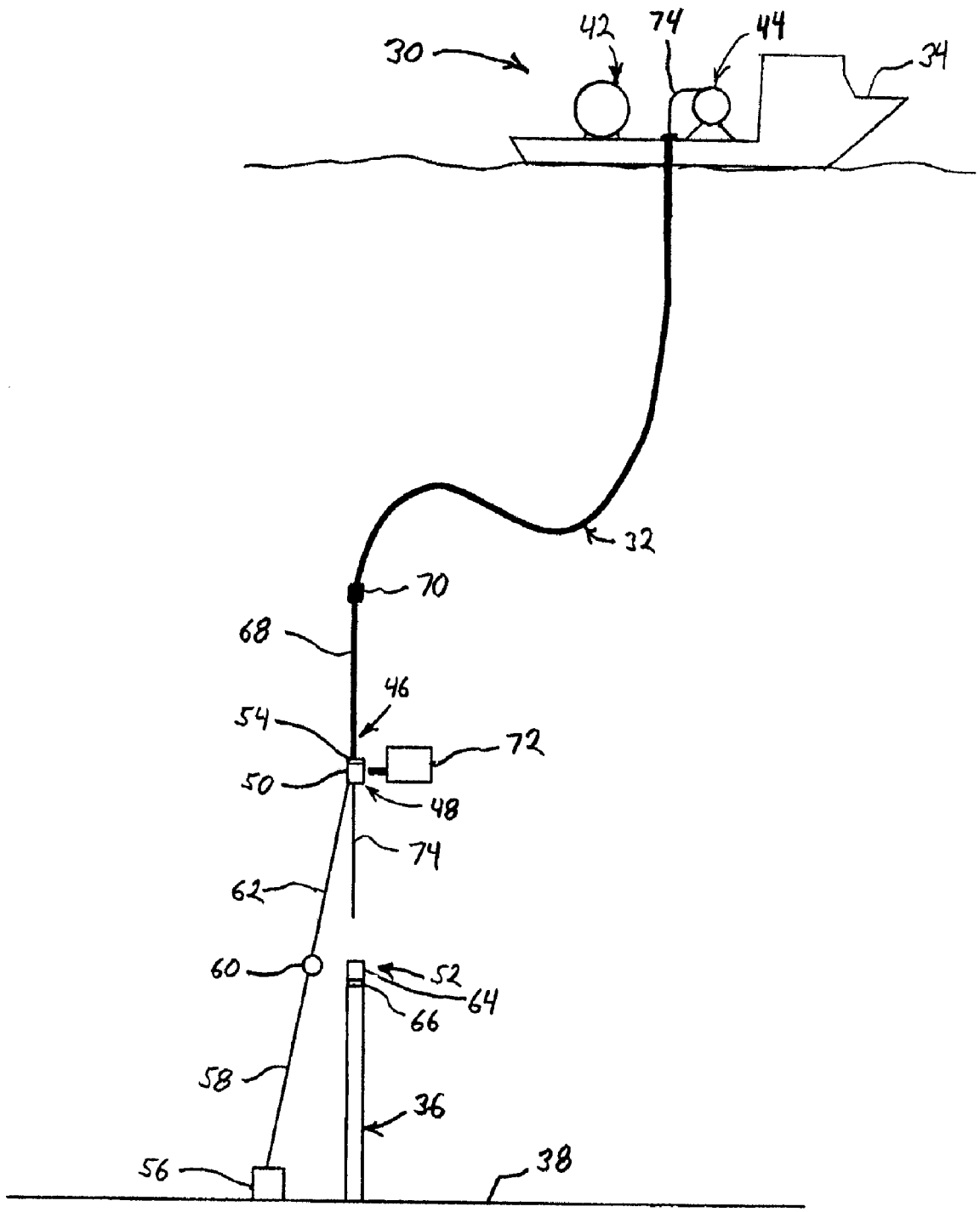
FIG. 5 is a schematic front elevation view similar to that of FIG. 4 but with the compliant tubular member positioned at a subsequent stage of deployment, according to an embodiment of the present invention.

Referring generally to FIG. 1, a subsea facility system 30 is illustrated according to an embodiment of the present invention. In this embodiment, subsea system 30 comprises a compliant tubular member 32 that may be deployed between a surface vessel 34 and a subsea facility 36 located on or at a seabed 38. It should be noted that compliant tubular member 32 forms a conduit that starts at surface vessel 34 and may be releasably connected to surface vessel 34. The compliant tubular member 32 is deployed first, and a conveyance member is then inserted through the compliant tubular member, as described in greater detail below. In the embodiment illustrated, compliant tubular member 32 comprises a spoolable compliant guide 40 being deployed toward subsea facility 36. The compliant tubular member 32 may be deployed from a deployment mechanism 42 located at the surface on, for example, surface vessel 34. Deployment mechanism 42 may comprise a reel, a winch, an injector, a tensioner or combinations of these devices. As described in greater detail below, a conveyance member can be deployed through compliant tubular member 32 after the compliant tubular member is run (see, for example, conveyance member 74 in FIG. 5). In many applications, the conveyance member is connected to a tool string after it has passed through the compliant tubular member 32. The conveyance member is deployed by a suitable deployment mechanism 44 located at the surface on, for example, surface vessel 34. In one example, the conveyance member comprises coiled tubing deployed through compliant tubular member 32 from surface vessel 34 via deployment mechanism 44.

In the embodiment illustrated, compliant tubular member 32 may be arranged in a variety of curvilinear shapes extending between surface vessel 34 and subsea facility 36. The compliant tubular member 32 can be arranged in compliant configurations designed to attenuate the motion of surface vessel 34 with respect to a lower end 46 of the compliant tubular member.

A distal end assembly 48 is connected to the lower end 46 of compliant tubular member 32. The distal end assembly 48 comprises a releasable connector 50 designed for connection to a gripper assembly/toolholder assembly 52 positioned at subsea facility 36. Distal end assembly 48 also may comprise one or more additional components 54, such as a dynamic seal that seals the annulus between an internal conveyance member (discussed below) and compliant tubular member 32 while allowing the conveyance member to move along its axis relative to the dynamic seal. However, the one or more additional components 54 also may comprise buoyancy material, a bend stiffener, a swivel to allow rotation of compliant tubular member 32 about its axis, instrumentation to provide information about the compliant tubular member or conveyance member, and/or other components that facilitate a given subsea operation in a given environment.

In FIG. 1, compliant tubular member 32 is illustrated as being deployed downwardly toward subsea facility 36 prior to connection at subsea facility 36 and prior to running of the conveyance member. In this environment, compliant tubular member 32 is being drawn by a clump weight 56. Clump weight 56 is connected to a rigging line 58 which, in turn, is connected to a buoyancy module 60. Buoyancy module 60 is connected to distal end assembly 48 by another rigging line 62. Rigging lines 58 and 62 are sufficiently strong to support clump weight 56 as clump weight 56 acts under the force of gravity to draw compliant tubular member 32 toward seabed 38.

In certain subsea operations, e.g. intervention operations, gripper assembly/toolholder assembly 52 is in the form of a gripper assembly designed to grip a conveyance member. In some intervention operations, gripper assembly/toolholder assembly 52 is in the form of a toolholder assembly designed to hold a tool string (see tool string 76 in FIG. 8). The gripper assembly/toolholder assembly 52 comprises a releasable connector 64 to releasably engage connector 50 of distal end assembly 48. The gripper assembly/toolholder assembly 52 also may comprise one or more additional components 66 such as a dynamic seal that seals the annulus surrounding an internal conveyance member while allowing the conveyance member to move along its axis relative to the dynamic seal. The additional components 66 also may comprise a releasable connector to releasably engage the subsea facility 36, a swivel to allow rotation of compliant tubular member about its axis, and instrumentation to provide data on the compliant tubular member, the conveyance member, the subsea facility, the environmental fluid, and/or other components used in a given subsea operation. Instrumentation can be used to measure a variety of parameters, including inclination, strain, pressure, temperature, tension, distance traveled by the conveyance member, and other parameters.

The subsea facility 36 may comprise a box, a tank, a pipe, a subsea lubricator, a subsea tree, a subsea wellhead, a subsea well or various combinations of these devices. The subsea facility 36 also can comprise other facilities that hold or carry fluids. For example, the subsea facility may comprise a subsea pipeline or riser and other non-well related facilities.

Figure 2:
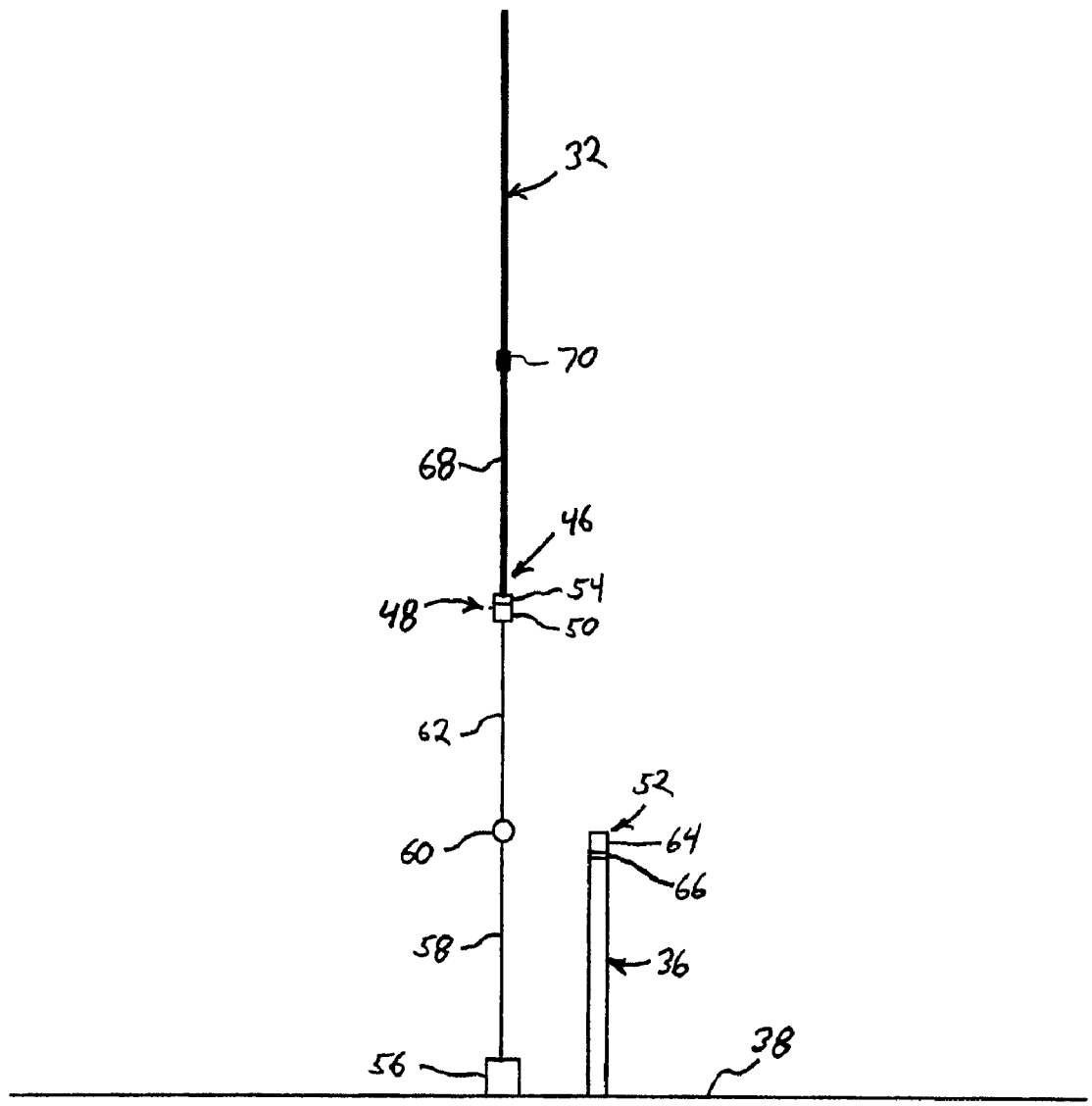
FIG. 2 is a schematic front elevation view similar to that of FIG. 1 but with the compliant tubular member positioned at a subsequent stage of deployment, according to an embodiment of the present invention.

As illustrated in FIG. 1, the assembly of compliant tubular member 32, distal end assembly 48, rigging lines 58, 62, buoyancy module 60 and clump weight 56 move in a downward direction, via deployment mechanism 42, from a surface facility, such as the illustrated surface vessel 34. Clump weight 56 has sufficient weight to overcome the natural buoyancy of a lower section 68 of compliant tubular member 32 and/or the additional buoyancy provided by one or more buoyancy modules 70. In other words, the negative buoyancy of clump weight 56 is greater than the positive buoyancy created at lower section 68 so that clump weight 56 falls to seabed 38, as illustrated in FIG. 2. Buoyancy modules 70 may be detachably mounted on compliant tubular member 32 at a position toward the upper end of lower section 68. The positive buoyancy force created tends to maintain lower section 68 in a generally vertical orientation even after full deployment of compliant tubular member 32. It should be noted that before clump weight 56 reaches seabed 38 under the controlled lowering motion, the entire compliant tubular member assembly moves up and down in an uncontrolled manner under the influence of surface vessel 34 floating at the surface of the sea.

Figure 3:
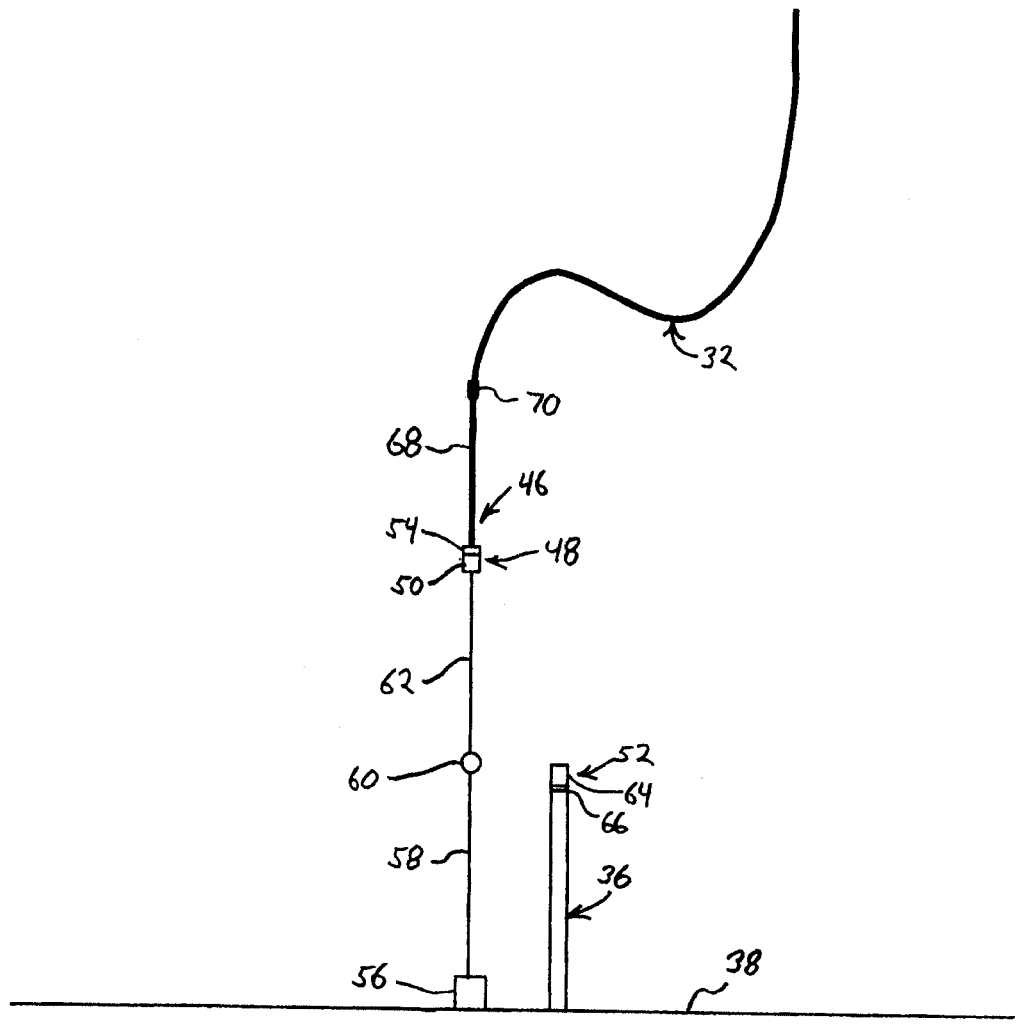
FIG. 3 is a schematic front elevation view similar to that of FIG. 2 but with the compliant tubular member positioned at a subsequent stage of deployment, according to an embodiment of the present invention.

Generally, clump weight 56 is landed either on seabed 38 at a predetermined distance from subsea facility 36 or on the subsea facility 36. After landing clump weight 56, compliant tubular member 32 is continually lowered into the sea by deployment mechanism 42. The positive buoyancy of lower section 68 and/or distal end assembly 48 ultimately aids in terminating uncontrolled movement of distal end assembly 48 as compliant tubular member 32 is deployed into a curvilinear shape, as illustrated in FIG. 3. The positive buoyancy also maintains tension on rigging lines 58, 62 between clump weight 56 and distal end assembly 48. The uncontrolled motion of the surface facility, e.g. surface vessel 34, now causes the shape of compliant tubular member 32 to change, but the motion of distal end assembly 48 is significantly attenuated relative to the motion of the surface facility. The compliant tubular member 32 is continually lowered into the sea by deployment mechanism 42 until its proximate end is free of the deployment mechanism 42 and releasably fixed to the surface vessel 34 in such a way as to allow insertion of the conveyance member. (The insertion of the conveyance member, e.g. conveyance member 74, often is initiated when the compliant tubular member 32 is fully deployed, as described in greater detail below with reference to FIG. 5) The position illustrated in FIG. 3 can be referred to as the "parked" or "parking" position. Prior to initial engagement of distal end assembly 48 with subsea facility 36 or during a subsequent period of disengagement, the compliant tubular member 32 and distal end assembly 48 can be allowed to move freely in the sea while in this parked, equilibrium position.

Figure 4:
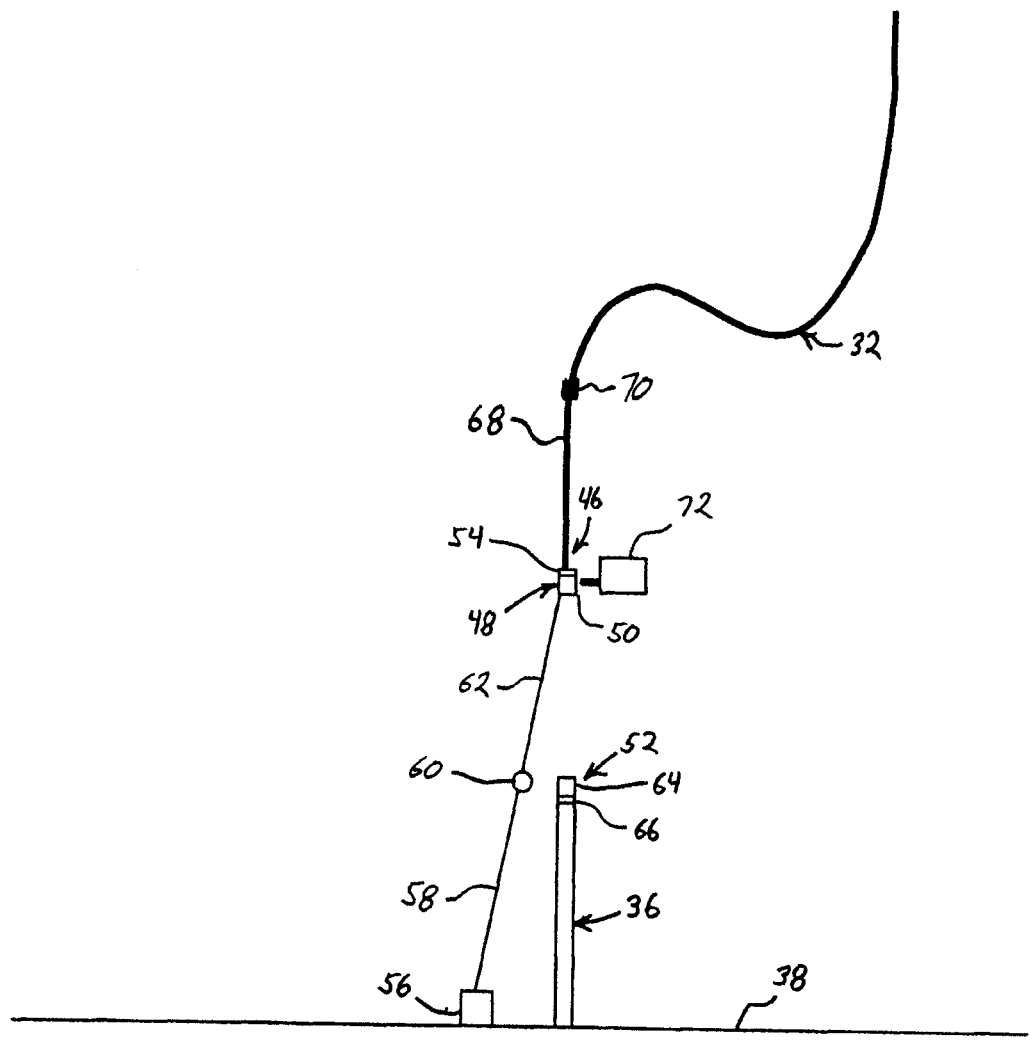
FIG. 4 is a schematic front elevation view similar to that of FIG. 3 but with the compliant tubular member positioned at a subsequent stage of deployment, according to an embodiment of the present invention.

To engage distal end assembly 48 with subsea facility 36, a remotely operated vehicle 72 can be used to initially move distal end assembly 48 in a generally horizontal direction, as illustrated in FIG. 4. The remotely operated vehicle 72 moves distal end assembly 48 until it is directly over the gripper assembly/toolholder assembly 52. Prior to, during and/or after the generally horizontal movement, a conveyance member 74 is delivered down through compliant tubular member 32, as illustrated best in FIG. 5.

Figure 6:
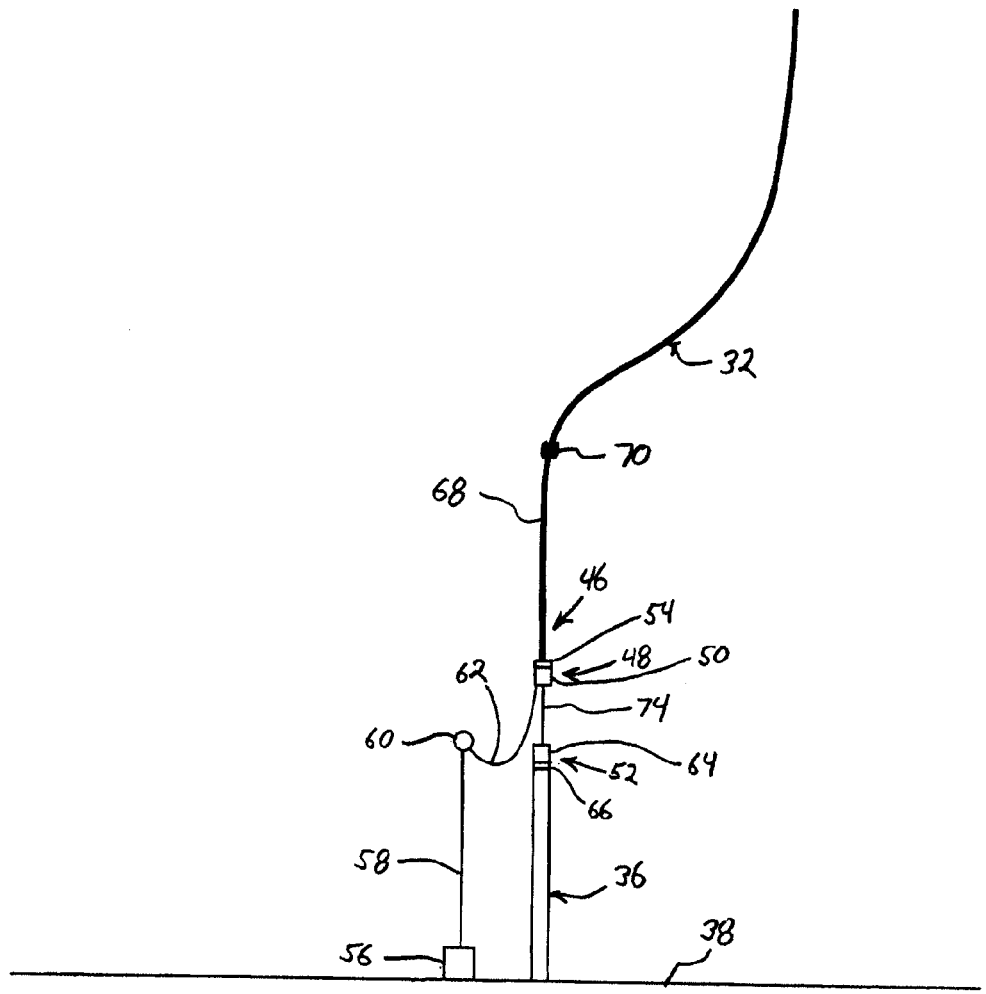
FIG. 6 is a schematic front elevation view similar to that of FIG. 5 but with the compliant tubular member positioned at a subsequent stage of deployment, according to an embodiment of the present invention.

The conveyance member 74 is deployed from the surface via deployment mechanism 44. The conveyance member 74 is inserted into the upper/proximate end of the compliant tubular member 32 at the surface vessel 34 and moved along its axis through the entire compliant tubular member 32 until it protrudes out beyond distal end assembly 48. At this stage, the deployed length of conveyance member 74, between surface vessel 34 and a subsea facility 36, is longer than the length of compliant tubular member 32. While a remotely operated vehicle 72 holds the appropriate position above the subsea facility 36, conveyance member 74 is continually run downwardly until it is inserted into gripper assembly/toolholder assembly 52, as illustrated in FIG. 6. A remotely operated vehicle 72 also can be used to facilitate this insertion. In the embodiment described, conveyance member 74 comprises coiled tubing. However, conveyance member 74 also may comprise a rod, a solid wire, a braided wire, a wireline, a slickline, or other suitable conveyance members used to convey tools into and out of a subsea facility. The deployment mechanism 44 may comprise a reel, a winch, an injector, a tensioner or combinations of these devices as suited to the specific type of conveyance member 74.

Once the distal end of the conveyance member 74 has entered the gripper assembly/toolholder assembly 52, it is releasably gripped or held in place. The gripping of conveyance member 74 can be achieved by a variety of components, such as mechanical components activated by movement of the conveyance member 74 or by a remotely controlled device. After conveyance member 74 is securely gripped, the direction in which conveyance member 74 is moved during deployment is reversed. In other words, the conveyance member 74 is moved upwardly from a surface location by deployment mechanism 44. Because the distal end of the conveyance member 74 is gripped and the proximate end of the compliant tubular member 32 is releasably fixed at the surface vessel 34, this moving of conveyance member 74 relative to compliant tubular member 32 causes distal end assembly 48 to move downwardly along conveyance member 74 toward subsea facility 36 and toward the gripper assembly/toolholder assembly 52. In this way, the deployed length of the conveyance member 74, between the surface vessel 34 and the subsea facility 36, is reduced until it equals the length of the compliant tubular member 32 and is generally at the limit of its movement.

Figure 7:
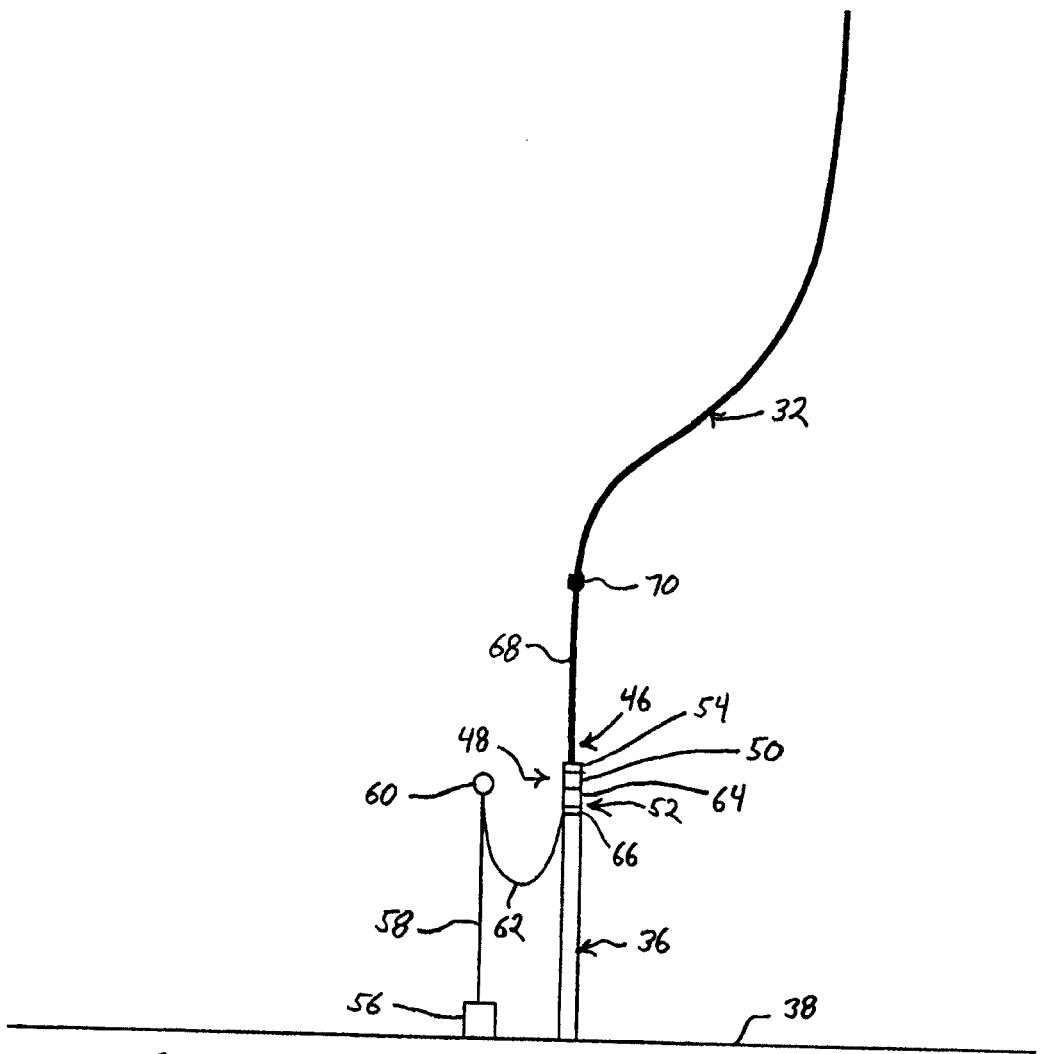
FIG. 7 is a schematic front elevation view similar to that of FIG. 6 but with the compliant tubular member engaged with the subsea facility, according to an embodiment of the present invention.

The length of the conveyance member 74, between the surface vessel 34 (or deployment mechanism 44) and subsea facility 36, is continually reduced until distal end assembly 48 is moved into engagement with subsea facility 36. In the specific embodiment illustrated, connector 50 is moved into engagement with corresponding connector 64 and connected thereto, as illustrated in FIG. 7. In this position, rigging line 58 remains in tension between clump weight 56 and buoyancy module 60, while rigging line 62 goes slack but remains clear of subsea facility 36. The lengths of rigging lines 58, 62 and the position of clump weight 56 are predetermined based on the size and geometry of subsea facility 36.

Figure 8:
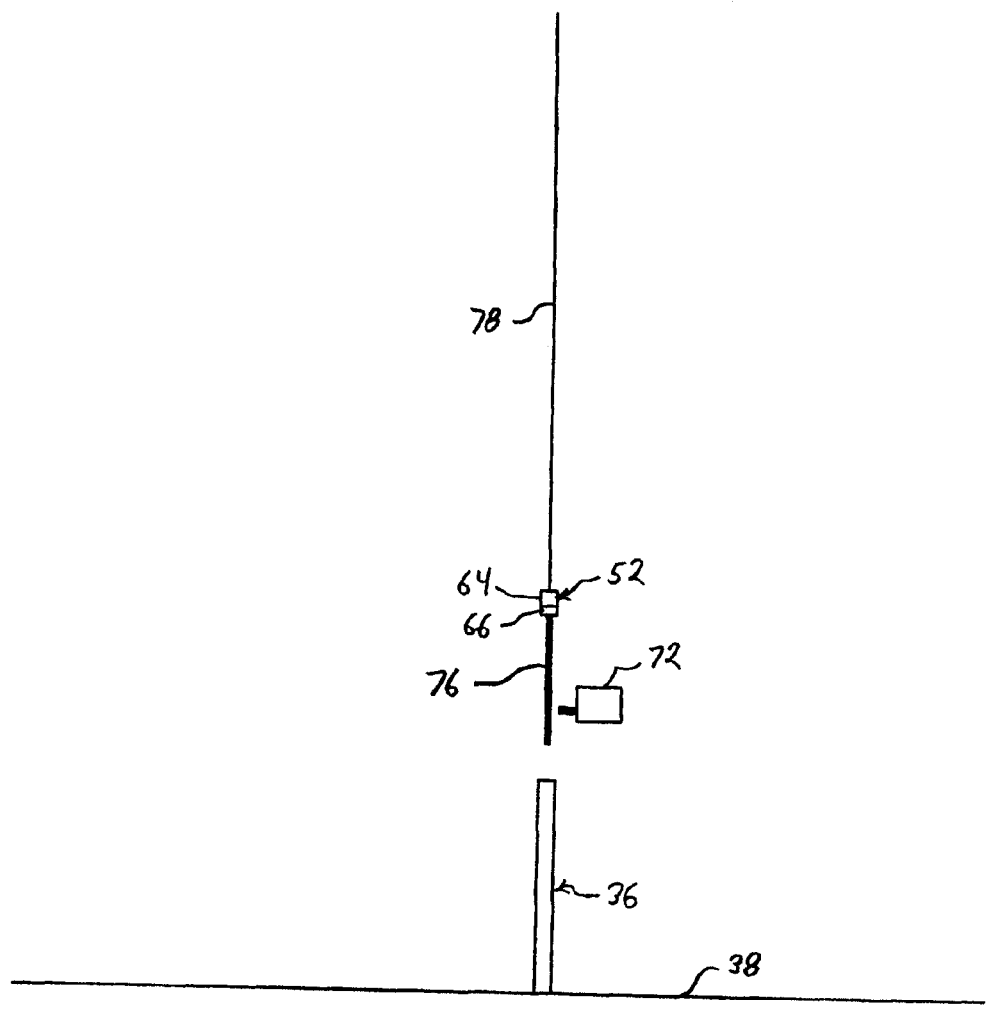
FIG. 8 is a schematic front elevation view illustrating a tool string being deployed on a lift line, according to an embodiment of the present invention.

In an alternate embodiment, a tool string 76 can be positioned into subsea facility 36 prior to connection of compliant tubular member 32/distal end assembly 48 with the subsea facility 36. The tool string 76 can be inserted in a variety of ways either when subsea facility 36 is at the surface, prior to deployment, or when it is already on the seabed 38. According to one embodiment, tool string 76 is lowered into subsea facility 36 using a releasable lift line 78, as illustrated in FIG. 8. Remotely operated vehicle 72 can be used to guide the tool string 76 into the subsea facility. By way of example, tool string 76 can be lowered together with toolholder assembly 52 inserted into subsea facility 36 until the toolholder assembly 52 is releasably connected with the subsea facility 36. The illustrated approach can be used to accomplish multiple changes of tool string 76 by alternately lifting one tool string to the surface and then lowering another tool string into subsea facility 36. Each time the tool string 76 is changed, the compliant tubular member 32 can be left in its parked position, as illustrated in FIG. 3. By taking the toolholder assembly 52 back to the surface with tool string 76, maintenance and redressing activities can be performed. These activities are particularly helpful in intervention applications where toolholder assembly 52 includes a dynamic seal that may require periodic replacement of sealing elements.

Figure 9:
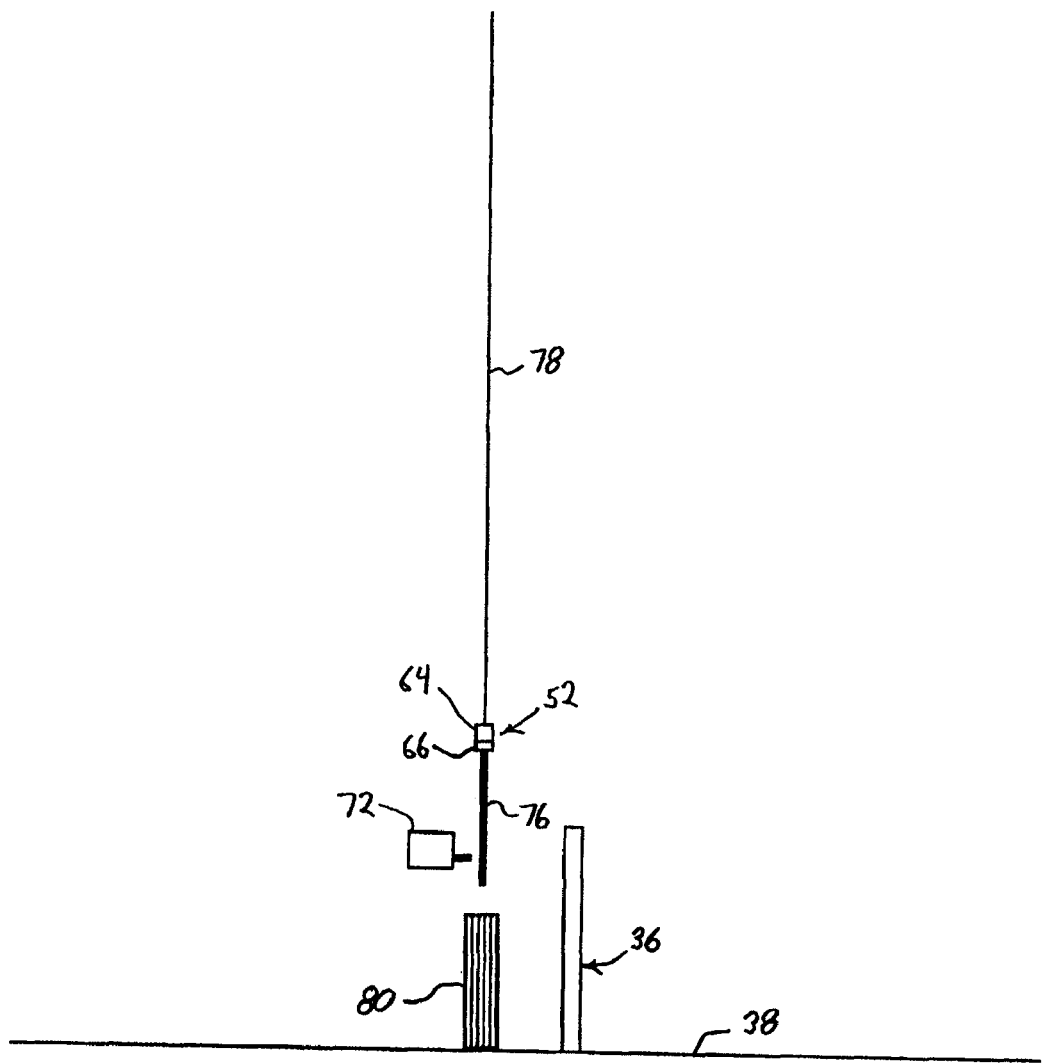
FIG. 9 is a schematic front elevation view of a subsea tool change operation, according to an alternate embodiment of the present invention.

In another embodiment, a tool rack 80 is positioned on or proximate seabed 38 or subsea facility 36 for proximate storage of additional tool strings, as illustrated in FIG. 9. Tool changes can be conducted as described with reference to FIG. 8, except the tool string removed from subsea facility 36 is interchanged with a tool string at tool rack 80 rather than requiring a trip to the surface. Remotely operated vehicle 72 can be used to facilitate the interchange of tool strings by positioning and actuating toolholder assembly 52, as necessary.

Figure 10:
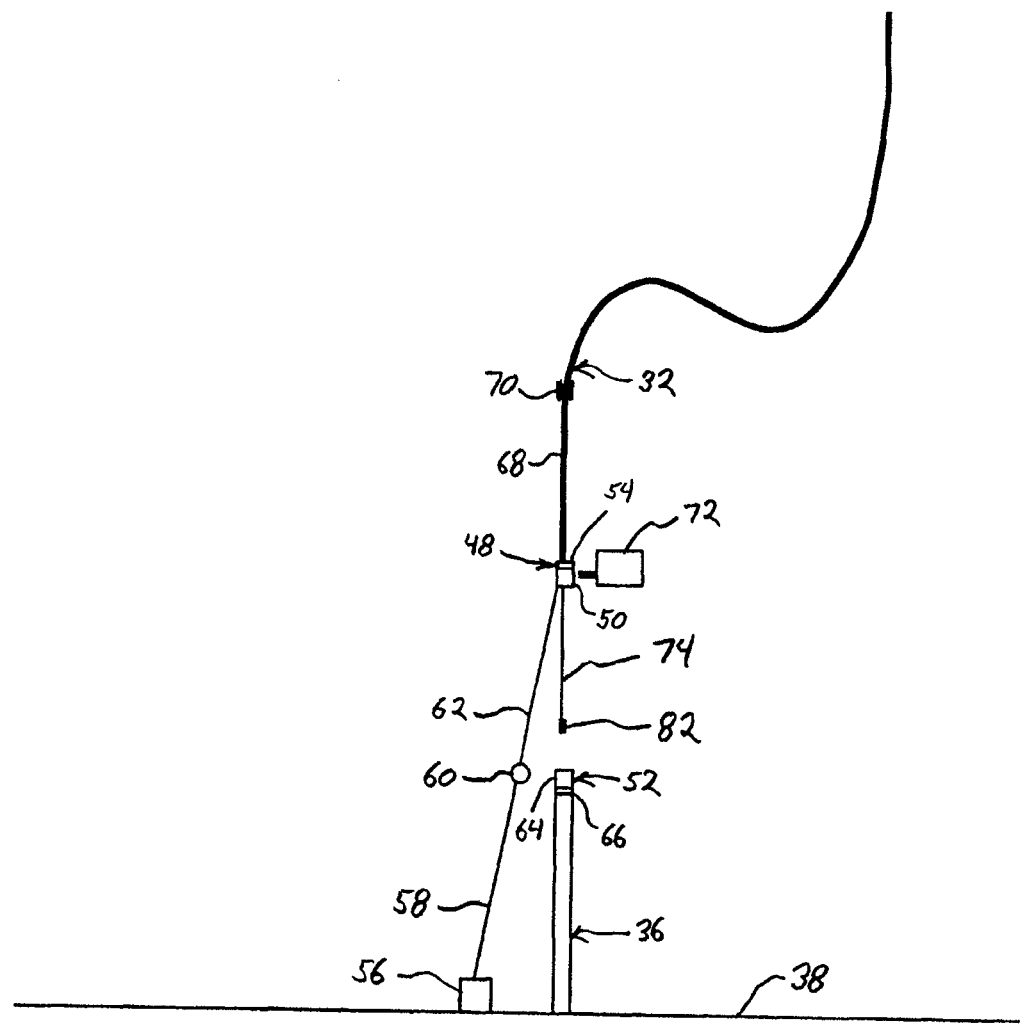
FIG. 10 is a schematic front elevation view of a compliant tubular member being moved into engagement with a tool string holder at the subsea facility, according to an embodiment of the present invention.

Whether compliant tubular member 32 is selectively engaged with a gripper assembly or a toolholder assembly, the conveyance member 74 can be used to draw distal end assembly 48 into engagement with gripper assembly/toolholder assembly 52. In some toolholder assembly applications, however, a remote tool string latch 82 can be included at the end of conveyance member 74, as illustrated in FIG. 10. Once the tool string 76 and the tool string latch 82 are releasably attached, they can be inserted as a unit further into the subsea facility to carry out a desired intervention operation. After completion of the intervention operation, the insertion steps are reversed to change out the tool string and/or to perform other procedures at the subsea facility 36. The methodologies described above are particularly helpful when tool strings 76 cannot be run through the compliant tubular member 32, e.g. through a spoolable compliant guide.

Figure 11:
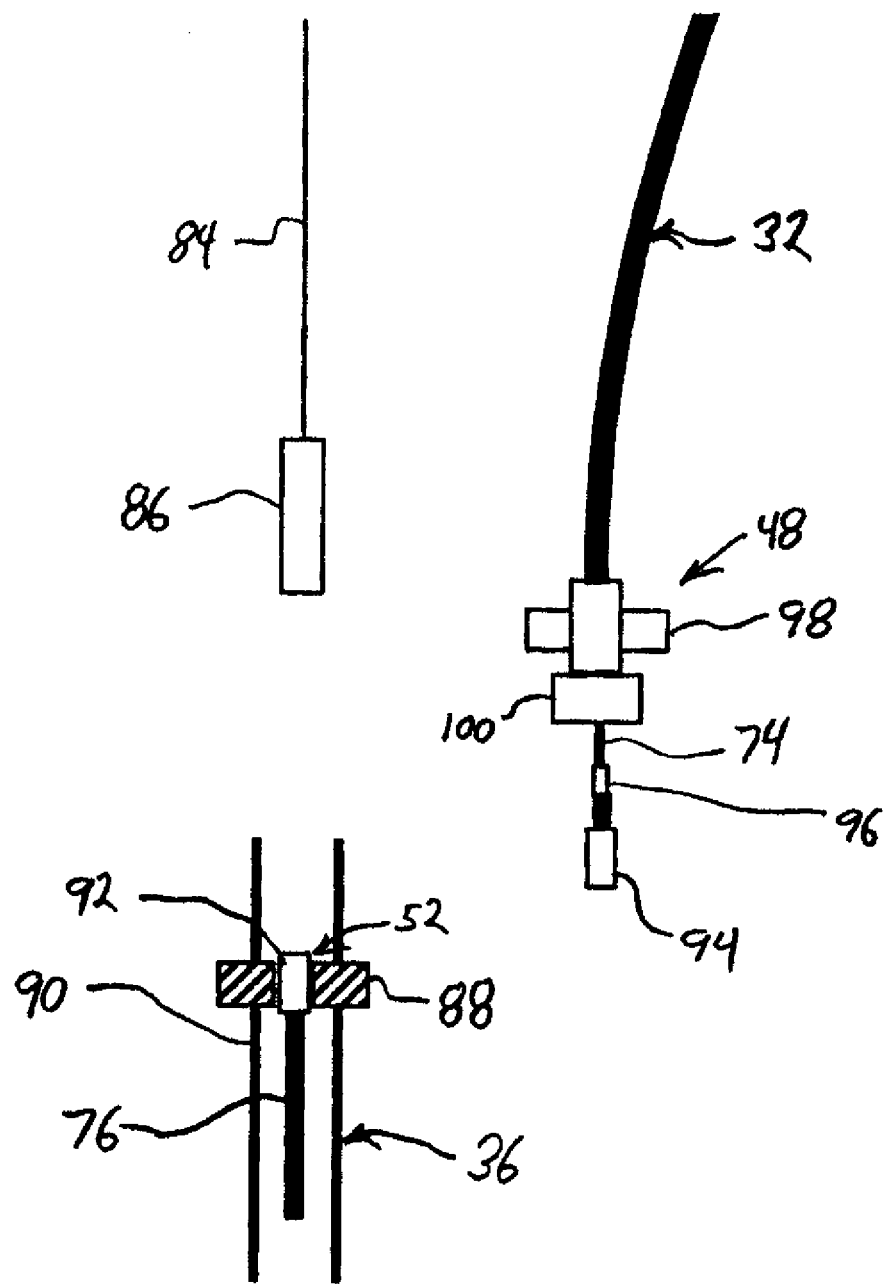
FIG. 11 is a schematic front elevation view of an alternate embodiment of the compliant tubular member system, according to an alternate embodiment of the present invention.

Furthermore, alternative structures and methods also can be employed to facilitate the connection of a tool string to a conveyance member without necessarily moving the tool string through the compliant tubular member. In the embodiment illustrated in FIG. 11, for example, a wireline 84 and a wireline running tool 86 are used to run and retrieve tool string 76, namely a coiled tubing tool string. During the initial run, the tool string 76 is delivered to subsea facility 36 and held by a tool catcher 88. The tool catcher 88 may be mounted on a variety of subsea facilities and subsea facility components such as, for example, a lubricator 90. The tool string 76 is initially coupled to a lower coiled tubing tool change connector 92 that forms part of an assembly having lower tool change connector 92 and an upper coiled tubing tool change connector 94. It should be noted that in many applications the upper connector 94 is too large to readily fit through compliant tubular member 32 so the upper connector 94 is initially delivered to the subsea facility 36 combined with lower connector 92 and tool string 76.

After the initial run, conveyance member 74 is engaged with upper coiled tubing tool change connector 94 via a coiled tubing end connector 96 below compliant tubular member 32. As illustrated, compliant tubular member 32 is coupled to distal end assembly 48 which, in this embodiment, comprises a stripper 98 and a latch 100 for latching onto subsea facility 36. During a tool change, upper connector 94 is separated from lower connector 92 so that distal end assembly 48 can be moved to a parked position during interchanging of tool strings. The wireline 84 and wireline running tool 86 can be used in subsequent runs for latching onto bottom connector 92 to enable interchanging tool string 76 with a subsequent tool string. The coiled tubing end connector 96 and upper connector 94 remain together until the end of the job at which time the coiled tubing conveyance member can be cut to separate the coiled tubing end connector 96 and attached upper connector 94. Remotely operated vehicle 72 may be used to cut the coiled tubing and to separately retrieve the coiled tubing end connector 96 and upper connector 94.

Figure 12:
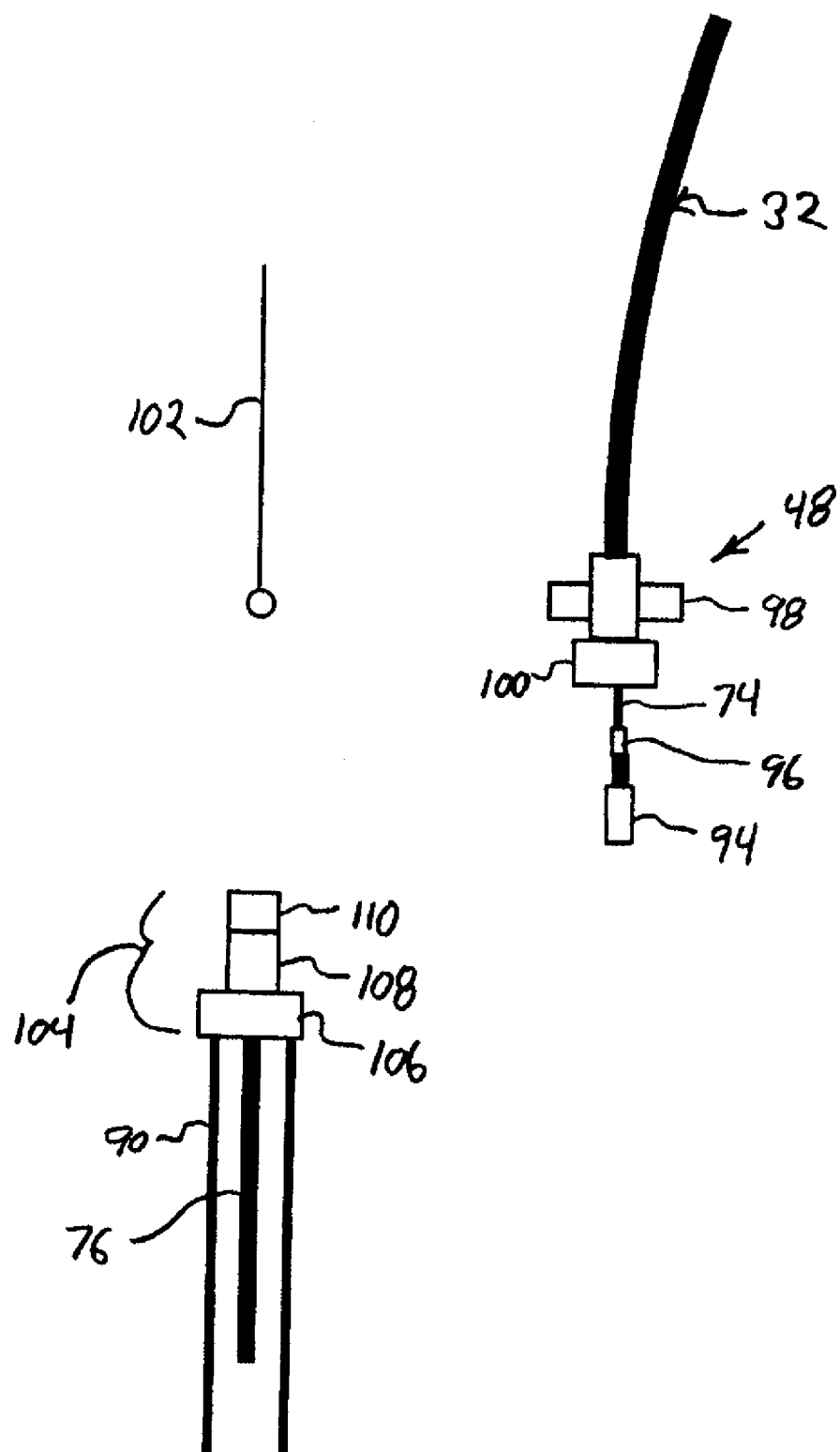
FIG. 12 is a schematic front elevation view of an alternate embodiment of the compliant tubular member system, according to an alternate embodiment of the present invention.

A modified embodiment is illustrated in FIG. 12. In this embodiment, the tool string 76 is initially run on a releasable lift wire 102 with a coiled tubing running tool 104. Running tool 104 comprises a first latch 106, a toolholder 108, and a second latch 110, although the running tool 104 may comprise a variety of additional components. The lower coiled tubing connector 92 is within coiled tubing running tool 104. First latch 106 enables connection to subsea facility 36, and second latch 110 enables latching with distal end assembly 48 via its latch 100. Tool handler 108 comprises an assembly for holding tool string 76. Furthermore, if upper coiled tubing tool change connector 94 is too large to be deployed down through compliant tubular member 32, then connector 94 is initially deployed with coiled tubing running tool 104 via releasable lift wire 102. As in the previous embodiment, conveyance member 74 is connected to upper connector 94 via coiled tubing end connector 96. Subsequent disconnections of distal end assembly 48 from coiled tubing running tool 104 are accomplished by unlatching and also separating upper connector 94 from lower connector 92. By using coiled tubing running tool 104, the coiled tubing tool string contains two types of connectors that enable connection with the distal end of the conveyance member. However, the additional or second connector/latch can be more sophisticated to enhance the latching and unlatching of tool strings.

Figure 13:
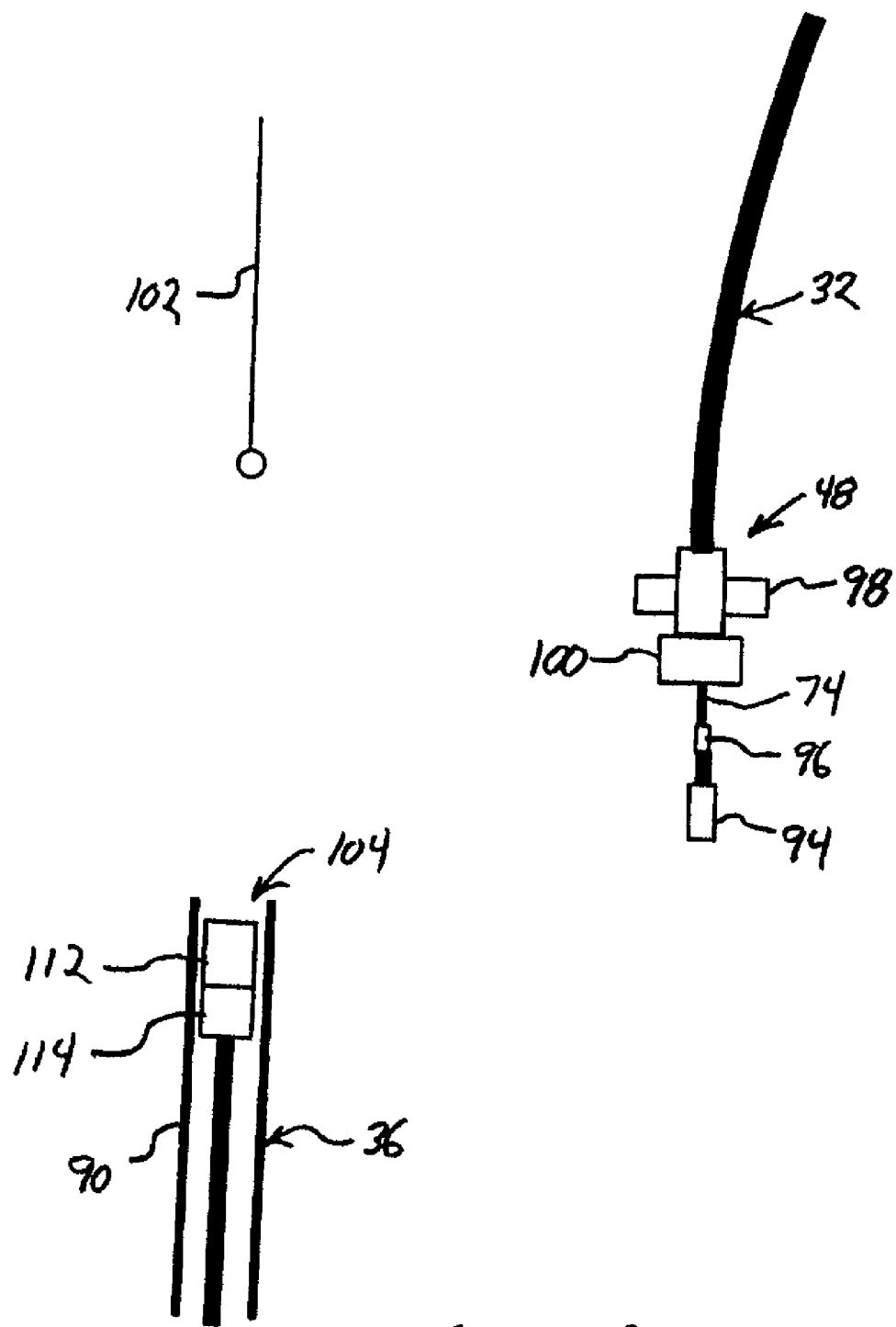
FIG. 13 is a schematic front elevation view of an alternate embodiment of the compliant tubular member system, according to an alternate embodiment of the present invention.

A similar embodiment is illustrated in FIG. 13. In this embodiment, the coiled tubing running tool 104 comprises a tool holder 112 and an internal latch or hang-off 114. Again, if upper coiled tubing tool change connector 94 is too large to be deployed down through compliant tubular member 32, then connector 94 is initially deployed with coiled tubing running tool 104 via lift wire 102. The lower coiled tubing tool change connector 92 can be positioned within toolholder 112. As in the embodiments illustrated in FIGS. 11 and 12, conveyance member 74 is connected to upper connector 94 via coiled tubing end connector 96. Subsequent disconnections of distal end assembly 48 from coiled tubing running tool 104 are accomplished by unlatching distal end assembly latch 100 from lubricator 90 or other appropriate component of subsea facility 36 and also separating upper connector 94 from lower connector 92.

Another approach to landing compliant tubular member 32 onto the subsea facility 36 involves using a heave compensated lift wire 116, as illustrated in FIGS. 14-16. Like the deployment methods described above, this approach also is able to utilize the remote connection of a coiled tubing tool string and coiled tubing or other conveyance member. As illustrated in FIG. 14, the lower end 46 of compliant tubular member 32 has negative buoyancy. The negative buoyancy can be accomplished by selecting suitable materials for distal end assembly 48 or by properly weighting lower end 46. The natural buoyancy of lower section 68 and/or the use of buoyancy module 70 can be used to maintain the lower section 68 of compliant tubular member 32 in a generally vertical orientation during engagement of compliant tubular member 32 with subsea facility 36

During the initial run or during subsequent tool string changes, distal end assembly 48 and the compliant tubular member 32 are supported in a parked position by heave compensated lift wire 116, as illustrated in FIG. 14. While in the parked position, the tool string 76 is lowered into subsea facility 36 by an appropriate lift line, wireline or other deployment mechanism. The tool string 76 can be guided into subsea facility 36 by a remotely operated vehicle 72 until the tool string is properly landed in a corresponding tool holder.

Subsequently, distal end assembly 48 is moved horizontally into alignment over subsea facility 36, as illustrated in FIG. 15. The movement into position over subsea facility 36 can be accomplished by movement of compensated lift line 116 and/or movement induced by a remotely operated vehicle 72. Movement of compensated lift line 116 can be achieved by moving the appropriate deployment equipment at a surface location, such as through movement of surface vessel 34. Once in alignment, distal end assembly 48 is lowered, via compensated lift line 116, into engagement with subsea facility 36. The negative buoyancy of lower end 46/distal end assembly 48 enables the downward movement of distal end assembly 48 into engagement with subsea facility 36.

It should be noted that the systems and methodology described herein can be used with a variety of subsea facilities, surface facilities, and compliant tubular members. In many applications, compliant tubular member 32 is a spoolable compliant guide. Additionally, many types of tool strings and other components can be deployed to the subsea facility either through the compliant tubular member or while the compliant tubular member is disengaged from the subsea facility. Additionally, other features can be used to further facilitate specific applications. Examples include the use of weights along compliant tubular member 32 to control its compliant shape and the use of releasable connectors, such as a releasable connector for attaching the compliant tubular member to the surface facility.

Although only a few embodiments of the present invention have been described in detail above, those of ordinary skill in the art will readily appreciate that many modifications are possible without materially departing from the teachings of this invention. Accordingly, such modifications are intended to be included within the scope of this invention as defined in the claims.

What is claimed is:

1. A method for connecting a compliant tubular member underwater, comprising:
    preparing a compliant tubular member on a sea surface vessel with a distal end having a positive buoyancy;
    drawing the distal end downward into proximity with a subsea facility at a seabed using a clump weight;
    deploying an additional length of the compliant tubular member until the compliant tubular member is arranged in a curvilinear shape to substantially reduce uncontrolled movements of the distal end of the compliant tubular member caused by motion of the surface vessel on the sea, wherein the clump weight secures the distal end of the compliant tubular member while the additional length of the compliant tubular member is deployed;
    moving the distal end with a remotely operated vehicle horizontally into vertical alignment with the subsea facility after said additional length of compliant tubular member has been deployed and arranged into a curvilinear shape;
    delivering a conveyance member through the compliant tubular member and into engagement with the subsea facility; and
    reducing the deployed length of the conveyance member from a surface location to move the distal end of the compliant tubular member into engagement with the subsea facility.

2. The method as recited in claim 1, wherein preparing comprises preparing a spoolable compliant tubular member.

3. The method as recited in claim 1, wherein delivering comprises delivering a coiled tubing through the compliant tubular member.

4. The method as recited in claim 1, wherein reducing comprises reversing movement of the conveyance member at a surface vessel.

5. The method as recited in claim 1, wherein delivering comprises inserting the conveyance member into a gripper assembly.

6. The method as recited in claim 1, further comprising placing a tool string into the subsea facility.

7. The method as recited in claim 6, wherein delivering comprises engaging the conveyance member with the tool string held in a toolholder assembly.

8. The method as recited in claim 6, further comprising lowering the tool string into the subsea facility with a lift line.

9. The method as recited in claim 6, further comprising parking the compliant tubular member in a proximate location during changing of the tool string.

10. The method as recited in claim 9, further comprising selecting a different tool string from a tool rack positioned at a subsea location.

11. The method as recited in claim 6, further comprising changing the tool string using wireline.

12. The method as recited in claim 6, further comprising changing the tool string using a coiled tubing running tool.

13. A method, comprising:
    arranging a compliant tubular member from a sea surface vessel to have a curvilinear shape when deployed to a subsea location wherein a clump weight secures a distal end of the compliant tubular member while the curvilinear shape is created;
    using buoyancy to maintain a lower section of the compliant tubular member generally vertical;

moving the distal end of the compliant tubular member horizontally with a remotely operated vehicle into generally vertical alignment with a subsea facility;

delivering a conveyance member through the compliant tubular member and into cooperation with the subsea facility; and reducing the deployed length of the conveyance member to move the distal end of the compliant tubular member into engagement with the subsea facility, wherein said arrangement is performed prior to moving the distal end of the compliant tubular member into generally vertical alignment with the subsea facility and said arrangement functions to substantially reduce uncontrolled movements of the distal end of the compliant tubular member caused by motion of the surface vessel on the sea.

14. The method as recited in claim 13, wherein arranging comprises arranging a spoolable compliant tubular member.

15. The method as recited in claim 13, wherein using buoyancy comprises mounting at least one buoyancy module to the lower section of the compliant tubular member.

16. The method as recited in claim 13, further comprising weighting the distal end of the compliant tubular member to create an overall negative buoyancy.

17. The method as recited in claim 16, further comprising lifting the distal end from the subsea facility with a compensated lift wire to enable a tool string change.

18. The method as recited in claim 13, further comprising selectively disengaging the distal end from the subsea facility, and changing a tool string positioned in the subsea facility.

19. A method, comprising:

deploying a compliant tubular member from a spool located on a sea surface vessel;

arranging said compliant tubular member to have a curvilinear shape when deployed to a subsea location wherein a clump weight secures a distal end of the compliant tubular member while the curvilinear shape is created;

placing the distal end of the compliant tubular member into vertical alignment with a subsea facility with a remotely operated vehicle;

delivering a conveyance member through the compliant tubular member; and lowering the distal end of the compliant tubular member into engagement with the subsea facility;

wherein said arrangement is performed prior to placing the distal end of the compliant tubular member into vertical alignment with the a subsea facility with the remotely operated vehicle wherein said subsea facility and said arrangement function to substantially reduce uncontrolled movements of the distal end of the compliant tubular member caused by motion of the surface vessel on the sea.

20. The method as recited in claim 19, wherein lowering comprises engaging the conveyance member with a gripper assembly in the subsea facility and driving the distal end of the compliant tubular member into engagement with the subsea facility by reducing the deployed length of the conveyance member.

21. The method as recited in claim 19, wherein lowering comprises engaging the conveyance member with a tool string held in a toolholder assembly in the subsea facility and driving the distal end of the compliant tubular member into engagement with the subsea facility by reducing the deployed length of the conveyance member.

22. The method as recited in claim 19, further comprising disengaging the distal end of the compliant tubular member from the subsea facility; and moving the distal end to a parked position proximate the subsea facility to accommodate a tool string change.

23. The method as recited in claim 19, wherein lowering comprises moving the distal end with a compensated lift wire.

* * * * *